(12) United States Patent
Jorgensen et al.

(10) Patent No.: US 8,797,902 B2
(45) Date of Patent: Aug. 5, 2014

(54) ROUTING DECISION CONTEXT OBJECTS

(75) Inventors: Peter K. Jorgensen, Nepean (CA); Robert A. Mann, Carp (CA)

(73) Assignee: Alcatel Lucent, Boulogne-Billancourt (FR)

( * ) Notice: Subject to any disclaimer, the term of this patent is extended or adjusted under 35 U.S.C. 154(b) by 19 days.

(21) Appl. No.: 13/482,597

(22) Filed: May 29, 2012

(65) Prior Publication Data

US 2013/0322327 A1 Dec. 5, 2013

(51) Int. Cl.
*H04J 1/16* (2006.01)

(52) U.S. Cl.
USPC ........................................... 370/252; 370/328

(58) Field of Classification Search
USPC ................................................ 370/328, 252
See application file for complete search history.

(56) References Cited

U.S. PATENT DOCUMENTS

| | | | |
|---|---|---|---|
| 2010/0215001 A1* | 8/2010 | Russell et al. | 370/329 |
| 2011/0188397 A1 | 8/2011 | McCann et al. | |
| 2011/0200053 A1 | 8/2011 | Kanode et al. | |
| 2012/0155389 A1* | 6/2012 | McNamee et al. | 370/328 |

FOREIGN PATENT DOCUMENTS

WO 2011100606 A2 8/2011

OTHER PUBLICATIONS

International Search Report with Written Opinion dated Aug. 21, 2013; for PCT/CA2013/050407.

* cited by examiner

*Primary Examiner* — Sai-Ming Chan
(74) *Attorney, Agent, or Firm* — Kramer Amado P.C.

(57) ABSTRACT

Various exemplary embodiments relate to a method and related network node including one or more of the following: receiving a Diameter message at the DRA from an origin device; establishing a routing decision context object in response to receiving the Diameter message, wherein the routing decision context object is associated with a destination device chosen to receive a previous message; evaluating a rule that includes a context object reference, wherein the evaluation includes accessing the routing decision context object based on the context object reference; and transmitting a message based on the evaluation of the rule.

20 Claims, 7 Drawing Sheets

ROUTING DECISION CONTEXT OBJECTS

CROSS-REFERENCE TO RELATED APPLICATIONS

This application is related to the following co-pending application, which is incorporated herein by reference: application Ser. No. 13/482,690, "ORGANIZATION OF DIAMETER ROUTING AGENT RULE SETS."

TECHNICAL FIELD

Various exemplary embodiments disclosed herein relate generally to computer networking.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAs) facilitate movement of packets in a network. In various deployments, DRAs may perform elementary functions such as simple routing, proxying, and redirect.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Diameter Routing Agent (DRA) for processing a Diameter message, the method including: identifying a context artifact, wherein the context artifact defines a context object type for use by the DRA; receiving a Diameter message at the DRA from an origin device; establishing a context object of the context object type defined by the context artifact; evaluating a rule that includes a context object reference, wherein the evaluation includes accessing the context object based on the context object reference; and transmitting a message based on the evaluation of the rule.

Various exemplary embodiments relate to a Diameter Routing Agent (DRA) for processing a Diameter message, the DRA including: a context artifact storage configured to store a context artifact that defines a context object type; a rule storage configured to store a rule that includes a context object reference; a Diameter stack configured to receive a Diameter message from an origin device; a context creator configured to establish a context object of the context object type defined by the context artifact; a rule engine configured to evaluate the rule, wherein the evaluation includes accessing the context object based on the context object reference; and a message handler configured to transmit, via the Diameter stack, a message based on the evaluation of the rule.

Various exemplary embodiments relate to a non-transitory machine-readable storage medium encoded with instructions for execution by a Diameter Routing Agent (DRA) for processing a Diameter message, the medium including: instructions for identifying a context artifact, wherein the context artifact defines a context object type for use by the DRA; instructions for receiving a Diameter message at the DRA from an origin device; instructions for establishing a context object of the context object type defined by the context artifact; instructions for evaluating a rule that includes a context object reference, including instructions for accessing the context object based on the context object reference; and instructions for transmitting a message based on the evaluation of the rule.

Various embodiments are described wherein the context artifact is a runtime library that defines a class of the context object.

Various embodiments are described wherein accessing the context object includes retrieving an attribute defined by the context artifact.

Various embodiments are described wherein accessing the context object includes invoking an action defined by the context artifact.

Various embodiments additionally include, prior to identifying the context artifact, receiving the context artifact via a user interface of the DRA.

Various embodiments additionally include locating an annotation in the context artifact; and generating a component name for the context object type based on the annotation, wherein the component name refers to at least one of an attribute and an action of the context object type.

Various embodiments additionally include receiving, via the user interface, a rule definition that corresponds to the rule, wherein the rule definition includes a reference to the component name, and the reference to the component name corresponds to the context object reference.

Various exemplary embodiments relate to a method performed by a Diameter Routing Agent (DRA) for processing a Diameter message, the method including: receiving a Diameter message at the DRA from an origin device; establishing a routing decision context object in response to receiving the Diameter message, wherein the routing decision context object is associated with a destination device chosen to receive a previous message; evaluating a rule that includes a context object reference, wherein the evaluation includes accessing the routing decision context object based on the context object reference; and transmitting a message based on the evaluation of the rule.

Various exemplary embodiments relate to a Diameter Routing Agent (DRA) for processing a Diameter message, the DRA including: a rule storage configured to store a rule that includes a context object reference; a routing decision database configured to store a previous routing decision, wherein the previous routing decision includes an identification of a destination device chosen for a previous message; a Diameter stack configured to receive a Diameter message from an origin device; a context creator configured to establish a routing decision context object based on receiving the Diameter message, wherein the routing decision context object is associated with the previous routing decision; a rule engine configured to evaluate the rule, wherein the evaluation includes accessing the routing decision context object based on the context object reference; and a message handler configured to transmit, via the Diameter stack, a message based on the evaluation of the rule.

Various exemplary embodiments relate to a non-transitory machine-readable storage medium encoded with instructions for execution by a Diameter Routing Agent (DRA) for processing a Diameter message, the medium including: instructions for receiving a Diameter message at the DRA from an origin device; instructions for establishing a routing decision context object in response to receiving the Diameter message, wherein the routing decision context object is associated with a destination device chosen to receive a previous message; instructions for evaluating a rule that includes a context object reference, including instructions for accessing the routing decision context object based on the context object reference; and instructions for transmitting a message based on the evaluation of the rule.

Various embodiments are described wherein transmitting a message based on the evaluation of the rule includes transmitting the Diameter message to the destination device.

Various embodiments are described wherein the Diameter message is associated with a first Diameter application and the previous message is associated with a second Diameter application.

Various embodiments additionally include, prior to receiving the Diameter message: receiving the previous message at the DRA; deciding that the previous message should be routed to the destination device; transmitting the previous message to the destination device; and storing an identification of the previous message and the destination device as a routing decision.

Various embodiments are described wherein accessing the routing decision context object includes updating a timestamp associated with the routing decision.

Various embodiments additionally include determining that the routing decision should be deleted based on a timestamp associated with the routing decision; and deleting the routing decision from a memory of the DRA.

Various embodiments are described wherein at least one of establishing the routing decision context object and accessing the routing decision context object includes: extracting at least one piece of identifying information from the Diameter message; and determining that the at least one piece of identifying information corresponds to the previous message.

Various exemplary embodiments relate to a method performed by a Diameter Routing Agent (DRA) for processing a Diameter message, the method including: receiving a Diameter message at the DRA from an origin device, wherein the Diameter message is associated with a subscriber; establishing a subscriber record context object in response to receiving the Diameter message, wherein the subscriber record context object is associated with a subscriber record of the subscriber; evaluating a rule that includes a context object reference, wherein the evaluation includes accessing the subscriber record context object based on the context object reference; and transmitting a message based on the evaluation of the rule.

Various exemplary embodiments relate to a Diameter Routing Agent (DRA) for processing a Diameter message, the DRA including: a rule storage configured to store a rule that includes a context object reference; a Diameter stack configured to receive a Diameter message from an origin device, wherein the Diameter message is associated with a subscriber; a context creator configured to establish a subscriber record context object, wherein the subscriber record context object is associated with a subscriber record of the subscriber; a rule engine configured to evaluate the rule, wherein the evaluation includes accessing the subscriber record context object based on the context object reference;

and a message handler configured to transmit, via the Diameter stack, a message based on the evaluation of the rule.

Various exemplary embodiments relate to a non-transitory machine-readable storage medium encoded with instructions for execution by a Diameter Routing Agent (DRA) for processing a Diameter message, the method including: instructions for receiving a Diameter message at the DRA from an origin device, wherein the Diameter message is associated with a subscriber; instructions for establishing a subscriber record context object in response to receiving the Diameter message, wherein the subscriber record context object is associated with a subscriber record of the subscriber; instructions for evaluating a rule that includes a context object reference, including instructions for accessing the subscriber record context object based on the context object reference; and instructions for transmitting a message based on the evaluation of the rule.

Various embodiments are described wherein at least one of establishing the subscriber record context object and accessing the subscriber record context object includes: determining at least one subscriber identifier associated with the Diameter message; and retrieving a subscriber record associated with the at least one subscriber identifier.

Various embodiments are described wherein retrieving the subscriber record includes transmitting a message to a subscriber profile repository (SPR).

Various embodiments are described wherein accessing the subscriber record context object includes reading a field of the subscriber record.

Various embodiments are described wherein accessing the subscriber record context object includes writing a value to the subscriber record, the method further including storing the modified subscriber record.

Various embodiments are described wherein accessing the subscriber record context object includes invoking an action of the subscriber record context object, and the action of the subscriber record context object invokes a function of the DRA other than a function of a context object.

Various embodiments are described wherein the function of the DRA retrieves a subscriber record from a subscriber profile repository.

BRIEF DESCRIPTION OF THE DRAWINGS

In order to better understand various exemplary embodiments, reference is made to the accompanying drawings, wherein.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Diameter Routing Agents (DRAs) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior.

Figure 1:
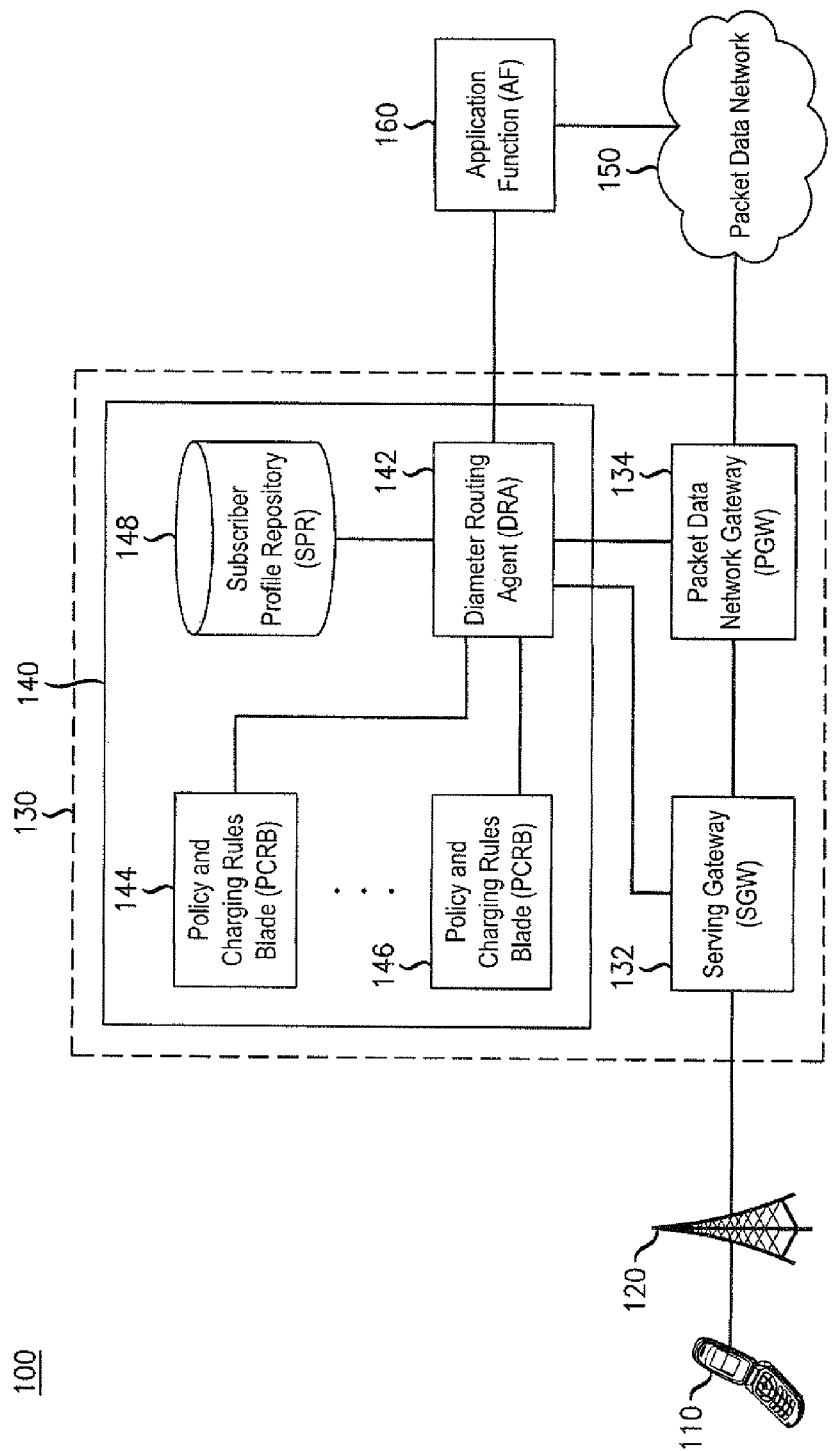
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 138 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
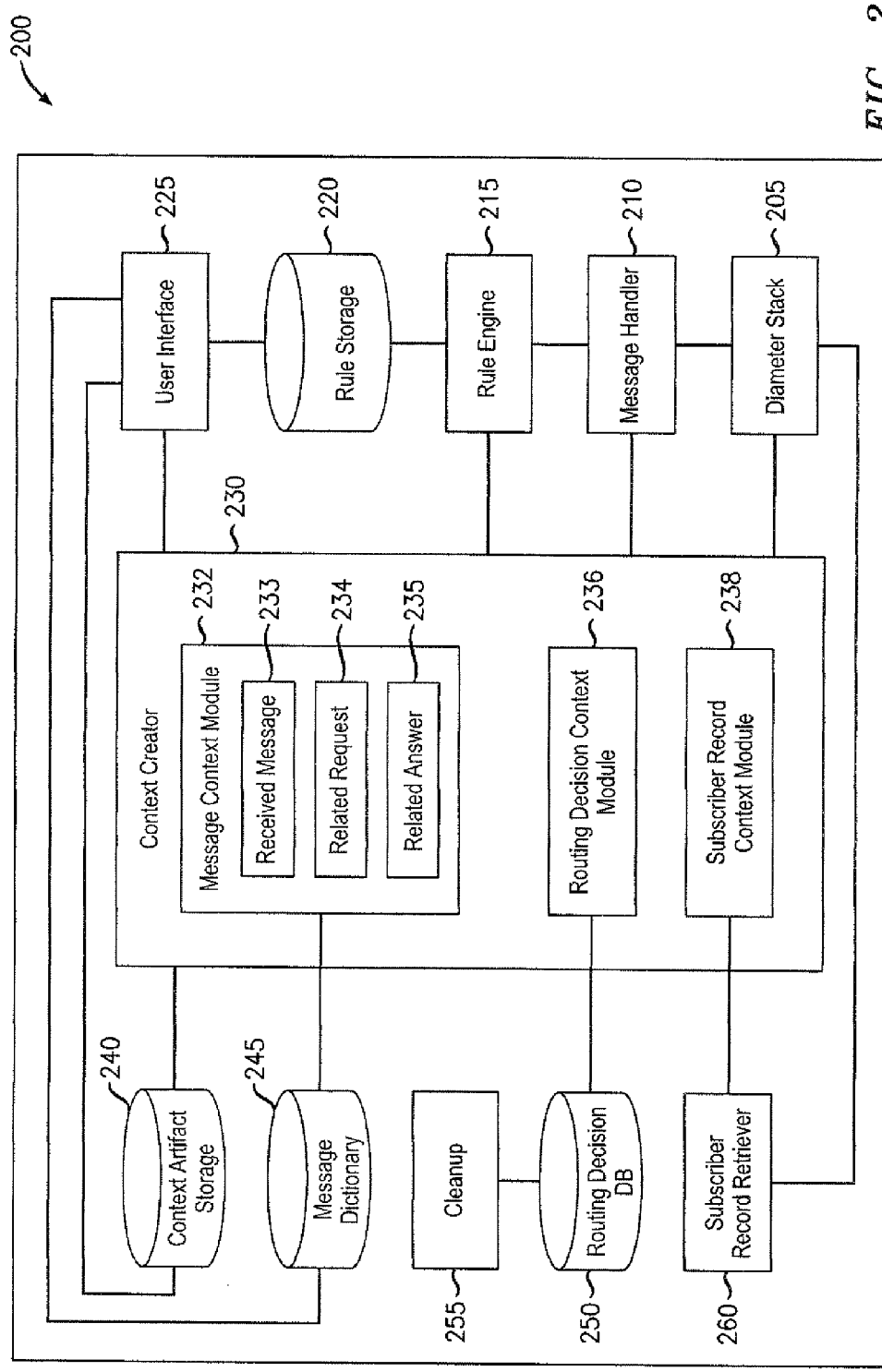
FIG. 2 illustrates an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, context creator 230, context artifact storage 240, message dictionary 245, routing decision database 250, cleanup module 255, or subscriber record retriever 260.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from on the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After the rule engine 215 finishes evaluating one or more rules, message handler 210 may transmit one or more messages via Diameter stack based upon one or more context object actions invoked by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more result of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structure for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

According to various embodiments, rule storage 220 may include rules that reference one or more "contexts" or "context objects." In such embodiments, context creator 230 may include hardware or executable instructions on a machine-readable storage medium configured to instantiate context objects and provide context object metadata to requesting components. Context objects may be instantiated at run time by context creator 230 and may include attributes or actions useful for supporting the rule engine 215 and enabling the user to define complex rules via user interface 225. For example, context creator 230 may provide context objects representing various Diameter messages, previous routing decisions, or subscriber profiles.

Upon DRA 200 receiving a Diameter message to be processed, message handler 210 may send an indication to context creator 230 that the appropriate context objects are to be instantiated. Context creator 230 may then instantiate such context objects. In some embodiments, context creator 230 may instantiate all known context objects or may only instantiate those context objects actually used by the rule set to be applied by rule storage 220. In other embodiments, context creator 230 may not instantiate a context object until it is actually requested by the rule engine 215.

Context creator 230 may additionally facilitate rule creation by providing context metadata to user interface 225. In various embodiments, context creator 230 may indicate to user interface 225 which context objects may be available for a rule set being modified and what attributes or actions each context object may possess. Using this information, user interface 225 may present a point-and-click interface for creating complex rules. For example, user interface 225 may enable the user to select a desired attribute or action of a context object from a list for inclusion in a rule under construction or modification.

Context creator 230 may rely on one or more context artifacts stored in context artifact storage 240 in establishing context objects. As such, context artifact storage 240 may be any machine-readable medium capable of storing one or more context artifacts. Accordingly, context artifact storage 240 may include a machine-readable storage medium such as read-only memory (ROM), random-access memory (RAM), magnetic disk storage media, optical storage media, flash-memory devices, and/or similar storage media. Context artifact storage 240 may store artifacts in various forms such as, for example, run-time libraries. In various embodiments, such run-time libraries may be stored as Java archive (.jar) files.

Each context artifact may define the attributes or actions available for a context object. In various embodiments, the context artifact may define one or more functions to be executed when an attribute or action is accessed. Such functions may utilize other functionality of the DRA 200, such as accessing the API of the Diameter stack, or may return values to the component that called the attribute or action. The context artifact may also include tags or other metadata for context creator 230 to provide to user interface 225 for describing the actions and attributes of the context object. In exemplary DRA 200, context artifact storage 240 may store context artifacts defining a message context, a routing decision context, or a subscriber record context. These context artifacts may be used by context creator 230 at run-time to instantiate different types of context objects. As such, context creator 230 may be viewed as including a message context module 232, a routing decision context module 236, and a subscriber record context module 238. In various embodiments, a user may be able to define new context artifacts via user interface 225 for storage in context artifact storage, such as by specifying an existing file (e.g. a .jar file).

Message context module 232 may represent the ability of context creator 230 to generate context objects representing and providing access to Diameter messages. For example, message context module 232 may generate a context object representing the received message. In various embodiments, message context module 232 may also be configured to generate a context object representing a request message or an answer message associated with the received Diameter message, as appropriate. As such, message context module 232 may be viewed as including a received message submodule 233, a related request submodule 234, and a related answer submodule 235.

The contents of Diameter messages may vary depending on the application and command type. For example, an RX RAA message may include different data from a GX CCR message. Such differences may be defined by various standards governing the relevant Diameter applications. Further, some vendors may include proprietary or otherwise non-standard definitions of various messages. Message context module 232 may rely on message definitions stored in message dictionary 245 to generate message contexts for different types of Diameter messages. For example, upon receiving a Diameter message, message handler 210 may pass the application and command type to the context creator 230. Message context module 232 may then locate a matching definition in message dictionary 245. This definition may indicate the AVPs that may be present in a message of the specified type. Message context module 232 may then instantiate a message context object having attributes and actions that match the AVPs identified in the message definition.

Message dictionary 245 may be any machine-readable medium capable of storing one or more context artifacts. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary 245. In various embodiments, the user-defined definitions may be stored in a different portion of message dictionary, such as a different directory, from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions. Message context module 232 may be configured to apply any applicable extension definitions when instantiating a new message context object or providing context metadata to user interface 225.

As noted above, upon receiving a Diameter message, message handler 210 may extract the application and command type and pass this information to context creator 230, which then may locate any applicable definitions to instantiate a new received message context object. Received message submodule 233 may be further configured to associate the new context object with the received Diameter message itself. For example, received message submodule 233 may copy the received Diameter message from Diameter stack 205 into a private or protected variable. Alternatively, received message submodule 233 may store an identification of the Diameter message useful in enabling access to the Diameter message via the API of the Diameter stack 205.

In various embodiments, DRA 200 may support the use of inverse message contexts. In such embodiments, upon extracting the command type from the received Diameter message, message handler 210 may identify the inverse command type as well. In some such embodiments, message handler 210 may implement a look-up table identifying the inverse for each message command. For example, upon determining that a received Diameter message is a Gx CCR, the message handler may determine that the inverse message would be a Gx CCA. Message handler 210 may pass this information to context creator 230 as well.

Upon receiving an inverse message type, message context module 232 may instantiate an inverse message context object in a manner similar to that described above with regard to the received message context object. Related request submodule 234 or related answer submodule 235, as appropriate, may also associate the new context object with message data. If the inverse message is a request message, related request module 234 may identify a previously-processed request message stored in Diameter stack 205 and associate the message with the new context object in a manner similar to that described above. In various embodiments, upon receiving an answer message, Diameter stack 205 may locate the previously-processed and forwarded request message to which the answer message corresponds. Diameter stack 205 may present this related request message through the API for use by context creator 230 or other components of DRA 200. By associating the previous request message with the related request context object, rule engine 215 may be provided with attributes capable of accessing the AVPs carried by the request message that prompted transmission of the answer message being processed.

When the inverse message is an answer message, on the other hand, related answer module 235 may construct a new answer message by, for example, requesting, via the API, that Diameter stack 205 construct the answer message. The new answer message may be completely blank or may include at least some values copied over from the received Diameter request message. Related answer module 235 may associate the new context object with the new answer message in a manner similar to that described above with respect to received message module 233. The related answer context object may then provide rule engine 215 with access to various actions capable of modifying the new answer message. For example, the rule engine may utilize an action of the related answer context object to set a result-code AVP of the answer message, thereby indicating to the message handler 210 that the answer should be sent back to the device that sent the received request. Message handler 210 may also then refrain from forwarding the received request message to any other devices.

As noted above, context creator 230 may be capable of defining other context objects that do not represent a Diameter message. Such context objects may be referred to as "computational contexts" and may also be defined by contexts artifacts in context artifact storage 240. As an example, routing decision context module 236 may be configured to instantiate a routing decision context object. Such routing decision context may identify, for each received Diameter message, a previously made routing decision that may be applicable to the received message. Such previously made routing decisions may be stored in routing decision database 250 along with a session identifier for correlating received messages to previously-processed messages. Routing decision database 250 may be any machine-readable medium capable of storing such routing decisions. Accordingly, routing decision database 250 may include a machine-readable storage medium such as read-only memory (ROM), random-access memory (RAM), magnetic disk storage media, optical storage media, flash-memory devices, and/or similar storage media.

Computational contexts may be supported by other DRA 200 functionality. For example, DRA 200 may include a cleanup module 255 that periodically removes stale entries from routing decision database 250. In some embodiments, the routing decision context object may not interact directly with cleanup module 255. Instead, cleanup module 255 may operate independently, while affecting the behavior of the routing decision context object indirectly by modifying the contents of routing decision database 250.

As another example of a computational context, subscriber record context module 238 may generate a subscriber record context object. The subscriber record context object may utilize other DRA 200 functionality, such as subscriber record retriever 260, to retrieve a subscriber record for received Diameter messages. Subscriber record retriever 260 may include hardware or executable instructions on a machine-readable storage medium configured to communicate with a subscriber profile repository (SPR) via Diameter stack 205 to retrieve a subscriber record for a Diameter message. Such communication may be performed, for example, according to the Sp application. Various methods of implementing subscriber record retriever 260 will be apparent. Through this retrieval of a subscriber record, the subscriber record context object may provide the rule engine 215 with access to the subscriber record It should be noted that while rule storage 220, context artifact storage 240, message dictionary 245, and routing decision database 250 are illustrated as separate devices, one or more of these components may be resident on multiple storage devices. Further, one or more of these components may share a storage device. For example, rule storage, context artifact storage 240, message dictionary 245, and routing decision database 250 may all refer to portions of the same hard disk or flash memory device.

Figure 3:
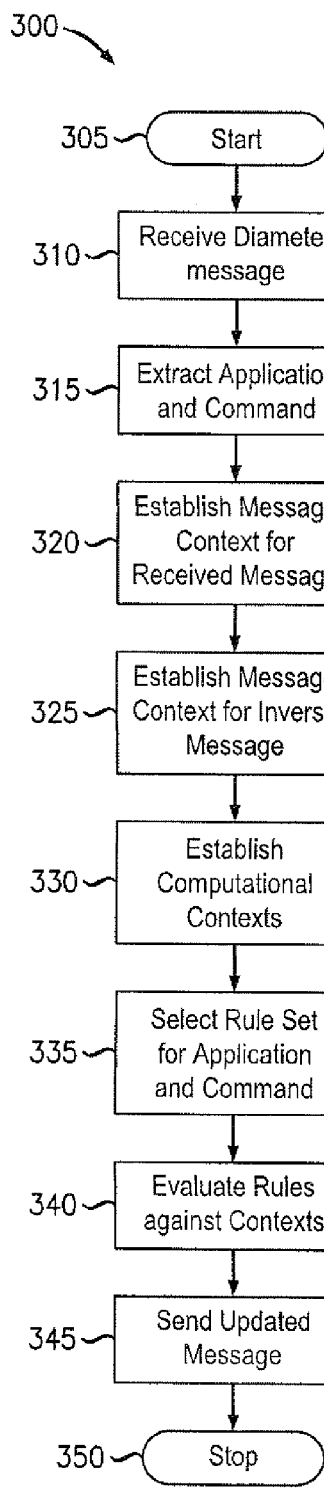
FIG. 3 illustrates an exemplary method for processing Diameter messages.

FIG. 3 illustrates an exemplary method 300 for processing Diameter messages. Method 300 may be performed by the components of DRA 200 such as, for example, Diameter stack 205, message handler 210, rule engine 215, or context creator 230.

Method 300 may begin in step 305 and proceed to step 310 where the DRA 200 may receive a Diameter message to be processed. Next, in step 315, the DRA 200 may extract a message type from the received Diameter message. In various embodiments, the message type may be defined by the application and command type of the message. Then, in step 320, the DRA may use the extracted message type to establish a message context object to wrap the received Diameter message. In a similar manner, the DRA 200 may establish a message context object for an inverse of the Diameter message in step 325. For example, the DRA 200 may use a lookup table to identify the inverse message type of the extracted message type and request a new message context based on the inverse message type.

The DRA 200 may then, in step 330, proceed to establish any other computational context objects for which the DRA 200 stores a context artifact or which the rule engine may request. For example, the DRA 200 may establish a routing decision context object and a subscriber record context object. After the appropriate context objects have been at least instantiated, method 300 may proceed to step 335 where the DRA 200 may select one or more appropriate rule sets to evaluate in processing the received Diameter message. In various embodiments, the DRA 200 may store a rule set for each message type. In some embodiments, DRA 200 may additionally or alternatively store a rule set that is generally applicable to all Diameter messages, all Diameter messages of a particular application, or another subset of Diameter messages.

After identifying the appropriate rule sets, the DRA 200 may evaluate the selected rule set or tables against the instantiated contexts in step 340. The individual rules may include references to various components of the context objects, herein referred to as "context object references." Such components may constitute attributes or actions of the context objects. To evaluate a rule including such a reference, the DRA may access the referenced component. For example, an attribute of a context object may be used in a comparison to determine whether a rule is applicable or an action of a context object may be used in applying the result of a rule. Various additional uses for a reference to a context object will be apparent. After applying the appropriate rule sets, the DRA 200 may transmit one or more messages to other devices in step 345. For example, the DRA may forward the Diameter message, which may be modified, to another device or may transmit an answer back to the device that sent the received message. Method 300 may proceed to end in step 350.

Figure 4:
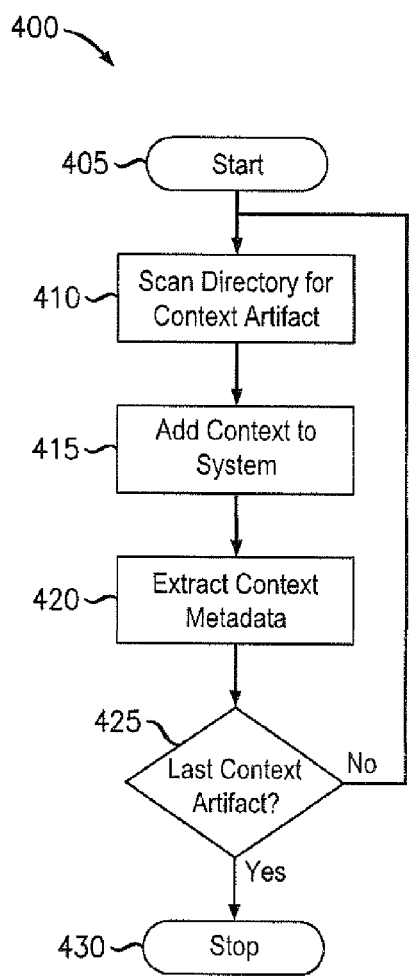
FIG. 4 illustrates an exemplary method for utilizing context artifacts.

FIG. 4 illustrates an exemplary method 400 for utilizing context artifacts. Method 400 may be performed by the components of DRA 200 such as, for example, user interface 225 or context creator 230. Method 400 may be performed, for example, upon system startup, upon request by user interface, or upon receiving a Diameter message. It will be understood that a context artifact may be used to define computational contexts as well as message contexts.

Method 400 may begin in step 405 and proceed to step 410 where the DRA may scan one or more directories for a context artifact to process. In various embodiments, the DRA may process all context artifacts located on a storage device or in a particular directory or may only process context artifacts specified in a list of artifacts to be processed. After locating a context artifact, method 400 may proceed to step 415, where the DRA may add a context object type to the system for use by a rule engine, a user interface, or a context creator. In various embodiments, such as embodiments wherein the context artifacts define one or more Java classes, step 415 may include interpreting the context artifact to enable instantiation of context objects having the context object type defined by the class. Various other methods for utilizing a context artifact to enable the use of new context object types will be apparent.

Next, in step 420, the DRA may extract any metadata for the context object type for the context object. For example, as will be explained in greater detail below with respect to FIG. 5, a context artifact may include annotations or tags that specify a user-friendly name for the context object type, attributes, or actions. The DRA may store this metadata for use by a user interface or rule engine. Next, in step 425, the DRA may determine whether additional context artifacts remain to be processed. If additional context artifacts remain, method 400 may loop back to step 410. Otherwise, method 400 may proceed to end in step 430.

As noted above, a context artifact may include annotations or tags specifying various metadata for use by the DRA. For example, a context artifact for a context object "Floober" may read, in part:

```
import
com.alcatel.tpapps.ddm.common.sourcecontexts.DDMContextBase;
...
@DDMContext(localizedName = "Floober")
public class FlooberContext extends DDMContextBase
```

-continued

```
{
    ...
    @DDMRuleAttribute(name = "Floober-Attribute")
    public String getFlooberValue( )
    {
        String aString;
        //Do stuff.
        ...
        return aString;
    }
    ...
    @DDMRuleAttribute(name = "Floober-Action")
    public void doFloober( )
    {
        //Do stuff.
        ...
    }
    ...
}
```

In the example above, the context artifact may include three annotations. A first annotation may specify a name for the context object type ("Floober") and the other two annotations may specify names for components of the context object ("Floober-Attribute" and "Floober-Action"). Using this metadata, a user interface may enable a user to construct rules including references to the functions getFlooberValue( ) and doFloober( ). Such references may be, for example, "Floober-.Floober-Attribute" and "Floober.Floober-Action," respectively.

Figure 5:
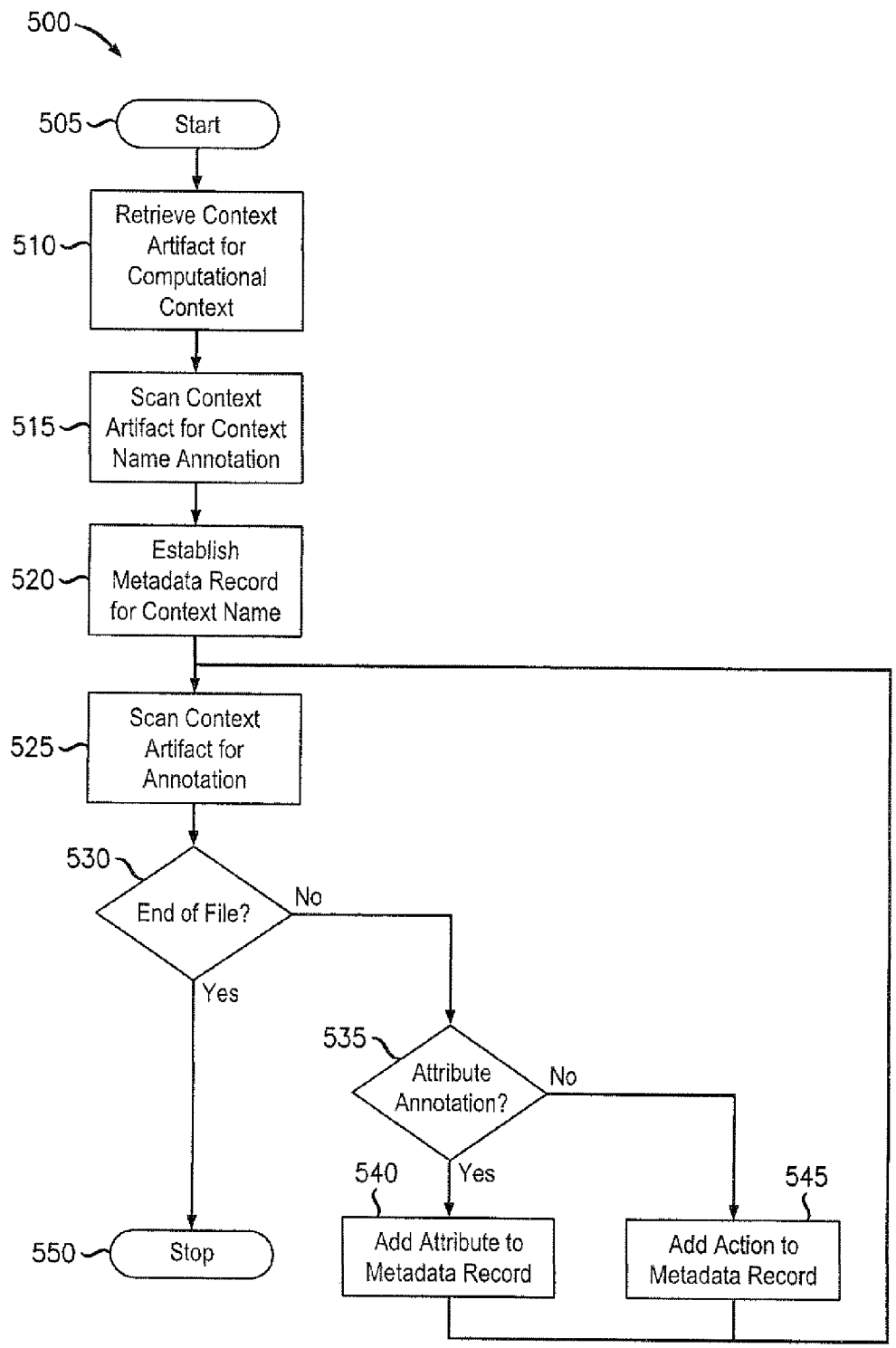
FIG. 5 illustrates an exemplary method for generating metadata for a context object.

FIG. 5 illustrates an exemplary method 500 for generating metadata for a context object. Method 500 may be performed by the components of DRA 200 such as user interface 225 or context creator 230. Method 500 may be performed at various times such as, for example, during system start up, upon request by a user interface, or upon request by a rule engine. In some embodiments, method 500 may correspond to step 420 of method 400 or may be performed along with step 330 of method 300.

Method 500 may begin in step 505 and proceed to step 510 where the DRA may retrieve a context artifact to process. This may involve retrieving an artifact from an artifact storage or simply identifying the artifact already retrieved in another method such as method 400. Next, in step 515, the DRA may scan the context artifact for a context name annotation. For example, the DRA may tokenize or otherwise parse the artifact to locate an annotation including the string "DDMContext," "localizedName," or another annotation. After locating the annotation, the DRA may, in step 520, establish a new metadata record including the name associated with the annotation. In the example above, the DRA may establish a metadata record for the name "Floober." The DRA may also associate the metadata record with the context object type defined by the artifact.

Next, in step 525, the DRA may scan the context artifact for an additional annotation. In various embodiments, the DRA may tokenize or otherwise parse the artifact to locate an annotation including the string "DDM," "DDMRuleAttribute," or another annotation. After attempting to locate such an attribute, the DRA may determine in step 530 whether the end of the artifact has been reached. If the DRA has reached the end of the file, method 500 may proceed to end in step 550. Otherwise, method 500 may proceed to step 535.

In step 535, the DRA may determine whether the annotation corresponds to an attribute or an action of a context object. In various embodiments, the annotation itself may specify whether the annotation applies to an attribute or action. In other embodiments, the DRA may evaluate the following function or variable to make this determination. For example, the DRA may determine that if the following function returns a value, then the annotation may correspond to an attribute. As another example, the DRA may determine that if the following function does not return any value, then the annotation may correspond to an action. If the annotation corresponds to an annotation, the DRA may, in step 540, add a new attribute to the metadata record associated with the appropriate class function. In the example above, the DRA may add the attribute name "Floober-Attribute" to the metadata record in association with the function getFlooberValue( ). If the annotation corresponds to an action, the DRA may, in step 540, add a new action to the metadata record associated with the appropriate class function. In the example above, the DRA may add the action name "Floober-Action" to the metadata record in association with the function doFloober( ). Method 500 may proceed to continue analyzing the artifact for additional annotations by looping from either step 540 or 545 back to step 525.

As noted above, context artifacts may be used to define computational contexts such as a "routing decision context object." For example, to define a routing decision context object, a context artifact may read, in part:

```
import
com.alcatel.tpapps.ddm.common.sourcecontexts.DDMContextBase;
...
@DDMContext(localizedName = "Routing Decision")
public class rdContext extends DDMContextBase
{
    protected Boolean decisionExists;
    protected String routingDecision;
    protected Boolean decisionFetched;
    @DDMRuleAttribute(name = "Decision-Exists")
    public Boolean getDecisionExists( )
    {
        return decisionExists;
    }
    @DDMRuleAttribute(name = "Update-Message-With-Destination")
    public void updateMessage( )
    {
        //Do stuff.
        ...
    }
    @DDMRuleAttribute(name = "Create-New-Routing-Decision")
    public void create( )
    {
        //Do stuff.
        ...
    }
    @DDMRuleAttribute(name = "Update-Timestamp")
    public void update( )
    {
        //Do stuff.
        ...
    }
    protected void FetchDecision( )
    {
        //Do stuff.
        ...
    }
    ...
}
```

Figures 6, 7:
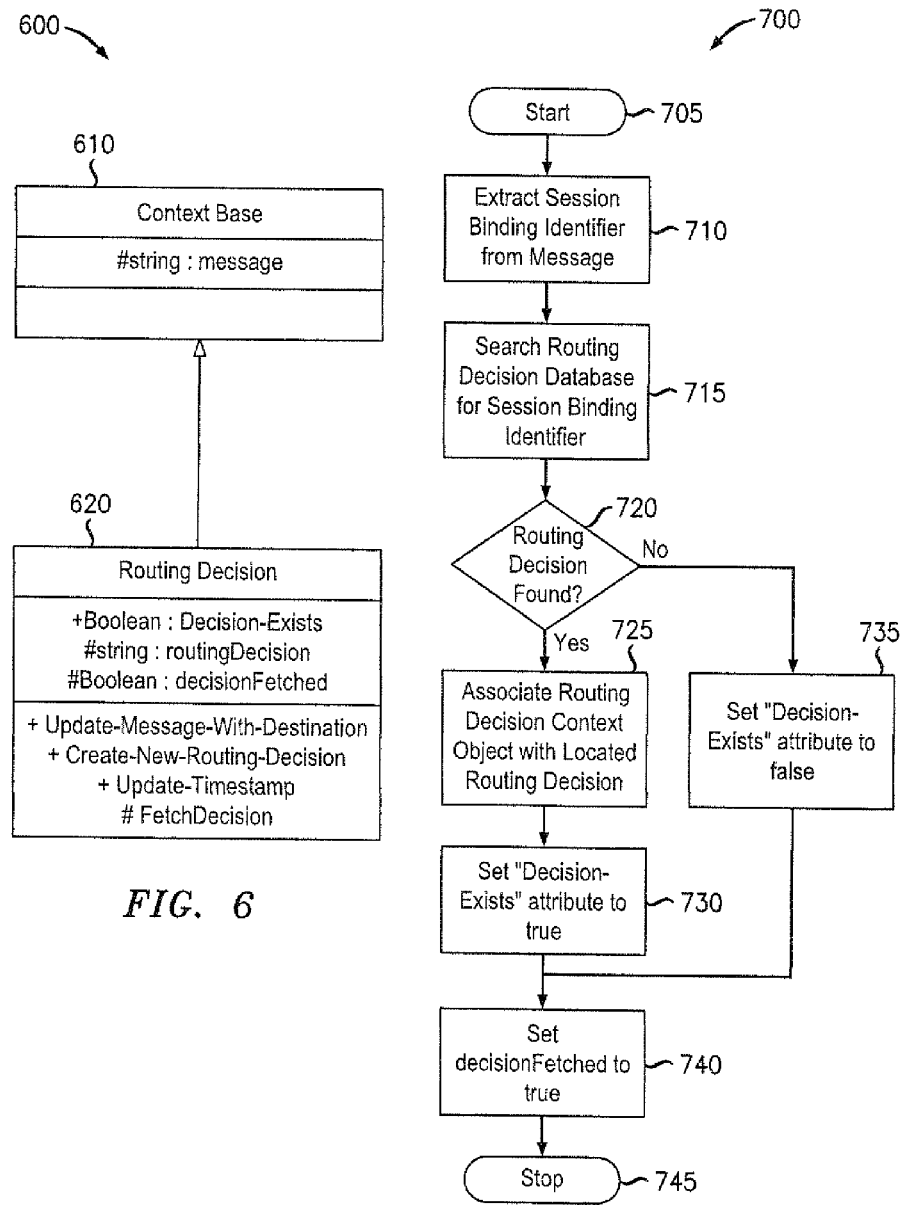
FIG. 6 illustrates an exemplary class diagram for a routing decision context object.
FIG. 7 illustrates an exemplary method for retrieving a previous routing decision.

FIG. 6 illustrates an exemplary class diagram 600 for a routing decision context object. Class diagram 600 may represent a context object based on the routing decision context object type defined in the exemplary context artifact above. Components associated with a component name as specified by annotations in the context artifact may be represented by such component names.

As shown, the routing decision context object 620 may extend a context base class 610. The context base class may include basic context object functionality. For example, the context base class 610 may include a protected string variable for storing the received Diameter message. Additionally or alternatively, the context base class may provide one or more functions for interfacing with an API of the Diameter stack to read or manipulate the received Diameter message or other Diameter messages. Various additional or alternative attributes and actions suitable for provision in a context base class will be apparent.

The routing decision context object 620 may extend the context base class 610 by adding one or more attributes or actions. For example, routing decision context object 620 may add a Boolean "Decision-Exists" attribute for use by the user interface or rule engine. It will be understood that, while the Decision-Exists attribute may be defined as a function in the context artifact, it may be viewed as an attribute by the rule engine or user interface because it returns a value. The routing decision context object may also include protected variables, such as "routingDecision" and "decisionFetched" for storing a routing decision record and an indication as to whether such routing decision record has been fetched, respectively.

A routing decision record may store various data for use by the DRA. For example, the routing decision record may include one or more identifiers for determining whether the routing decision record applies to the present Diameter message. In various embodiments, these identifiers may be taken together to constitute a "Session Binding Identifier" (SBI). The SBI may include an IPv4 address, an IPv6 address, one or more subscriber identifiers, an access point name (APN), or a Diameter session identifier. The routing decision record may also include an identification of a device to which a previous Diameter message was routed along with a timestamp. The timestamp may be used, for example, in determining when to delete the routing record from memory as part of a cleanup operation.

The routing decision context object may also include a number of actions. For example, the routing decision context object 620 may include an "Update-Message-With-Destination" action. This action may extract the destination from the routing decision record, and insert the destination identifier into a Destination-Host AVP of the received Diameter message. As another example, the routing decision context object 620 may include a "Create-New-Routing-Decision" action that may create a new routing decision record for storage in a routing decision database. For example, a rule may call the "Create-New-Routing-Decision" action after updating a Diameter message with a new Destination-Host. The "Create-New-Routing-Decision" action may then extract an SBI and the destination host to create a new record bearing a current timestamp. As another example, an "Update-Timestamp" action may overwrite an old timestamp in the routing decision record with a current timestamp to delay cleanup of the routing decision record. Additional actions (not shown) that may be included in a routing decision context object may include an action for removing the routing decision record for the session associated with the message being processed or an action removing all routing decision records related to the current message (e.g., all sessions for the same IP).

Various attributes and actions described above may rely on the presence of a routing decision. As such, the routing decision context object 620 may also include a protected "Fetch-Decision" function that may extract an SBI from a received message and attempt to locate a routing decision record in a routing decision database that matches the SBI. In various embodiments, the "FetchDecision" function may be called when a routing decision context object is initialized, such as by a class constructor of the routing decision context object.

In other embodiments, the routing decision context object 620 may not call "FetchDecision" until such time as the routing decision record is to be used. For example, the "Update-Message-With-Destination," "Decision-Exists," and "Update-Timestamp" components may each call "Fetch-Decision" when the "decisionFetched" variable is false.

FIG. 7 illustrates an exemplary method 700 for retrieving a previous routing decision. Method 700 may correspond to the "FetchDecision" function of routing decision context object 620. Method 700 may be performed by the components of a DRA such as, for example, context creator 230.

Method 700 may begin in step 705 and proceed to step 710 where the DRA may extract an SBI from the received Diameter message in step 710. As noted above, the SBI may be composed of multiple identifiers, some of which may be present in the Diameter message. Next, in step 715, the DRA may search the routing decision database for a record that matches at least a portion of the SBI. It will be appreciated that, based on the matching of an SBI, the routing decision context object may locate a routing decision for a previous Diameter message, even when the previous Diameter message was sent according to a different application or command than the received Diameter message. For example, the DRA may receive an Rx AAR and, based on the SBI, locate a routing decision previously made for a Gx CCR.

Next, in step 720, the DRA may determine whether a routing decision record was located. If such a record was located, method 700 may proceed to step 725. In step 725, the DRA may associate the routing decision context object with the located routing decision record by, for example, copying the record into a variable of the routing decision context object or otherwise enabling the functions of the routing decision context object to read or modify the routing decision record. Then, in step 730, the DRA may set a "Decision-Exists" attribute of the routing decision context object to "true."

If, on the other hand, the DRA is unable to locate a matching routing decision record, method 700 may proceed instead from step 720 to step 735. In step 735, the DRA may set a "Decision-Exists" attribute of the routing decision context object to "false." Method 700 may proceed from either step 730 or 735 to step 740. In step 740, the DRA may set a "decisionFetched" variable to "true." The routing decision context object may subsequently avoid executing method 700 again based on the "true" value of "decisionFetched."

As noted above, in various embodiments, the routing decision records stored in routing decision database 250 may be periodically cleaned up based on timestamps associated therewith. For example, a cleanup module 255 may periodically audit a routing decision database 250 by examining the timestamp of each routing decision record. The cleanup module 255 may be configured with a "time to live" value for the routing records and, based on this value and the current time, determine whether each record has surpassed the preconfigured time to live. If so, the cleanup module 255 may remove the record from routing decision database 250.

As another example of a computation context, a context artifact may define a "subscriber record context object." For example, to define a subscriber record context object, a context artifact may read, in part:

```
import
com.alcatel.tpapps.ddm.common.sourcecontexts.DDMContextBase;
...
@DDMContext(localizedName = "Subscriber Record")
public class subContext extends DDMContextBase
```

-continued

```
{
    protected Boolean recordFetched;
    protected String subscriberRecord;
    protected Subids subscriberIDs;
    protected void FetchRecord( )
    {
        //Do stuff.
        ...
    }
    ...
}
@DDMContext(localizedName = "Subscriber-IDs")
public class Subids
{
    @DDMRuleAttribute(name = "get")
    Public String get ( )
    {
        String result;
        //Do stuff.
        ...
        return result;
    }
    @DDMRuleAttribute(name = "add")
    Public void addid (String str)
    {
        //Do stuff.
        ...
    }
    @DDMRuleAttribute(name = "remove")
    Public void remid ( )
    {
        //Do stuff.
        ...
    }
    @DDMRuleAttribute(name = "set")
    Public void setid (String str)
    {
        //Do stuff.
        ...
    }
    ...
}
```

As shown in the above example, classes contained within other classes may also include annotations. For example, the "subContext" class may contain an object defined by the "Subids" class. The "Subids" class may include a number of annotations for a number of attributes of actions. Further, the "Subids" class itself may be annotated with a component name, such as "Subscriber-IDs," preceding the class definition. Various alternative arrangements will be apparent. For example. the annotation for the "Subids" class may instead be located within the definition of the "subContext" class, preceding the definition of the "subscriberIDs" object.

Figure 8:
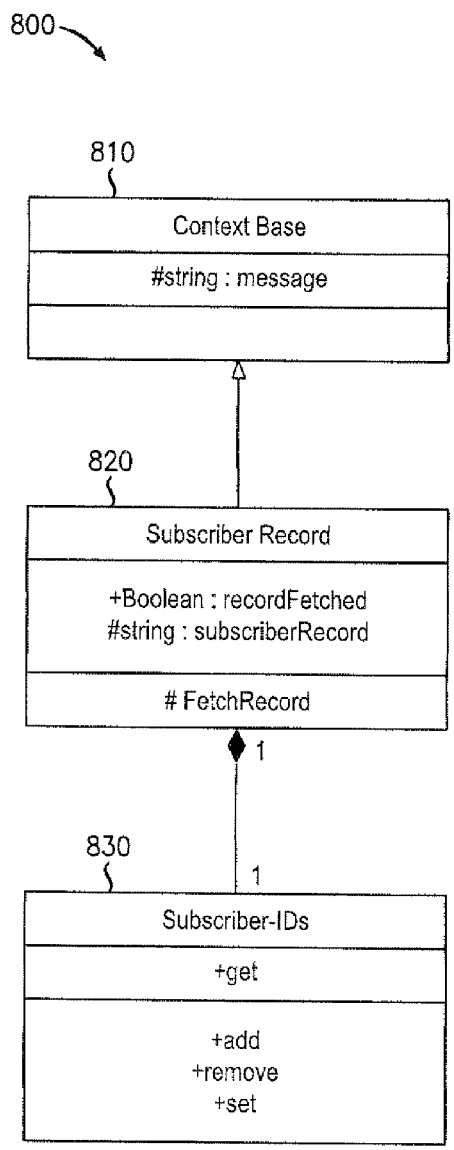
FIG. 8 illustrates an exemplary class diagram for a subscriber record context object.

FIG. 8 illustrates an exemplary class diagram 800 for a subscriber record context object. Class diagram 800 may represent a context object based on the subscriber record context object type defined in the exemplary context artifact above. Components associated with a component name as specified by annotations in the context artifact may be represented by such component names.

As shown, the subscriber record context object 820 may extend a context base class 810. It will be understood that various other inheritances may be used. For example, a subscriber record context object 820 may extend a CommonLDAPContext object (not shown) which may implement basic functionality for interfacing with an LDAP server or database. Such a CommonLDAPContect object may, in turn, extend the context base class 810. Various other arrangements of classes and inheritances will be apparent.

The context base class may include basic context object functionality. For example, the context base class 810 may include a protected string variable for storing the received Diameter message. Additionally or alternatively, the context base class may provide one or more functions for interfacing with an API of the Diameter stack to read or manipulate the received Diameter message or other Diameter messages. Various additional or alternative attributes and actions suitable for provision in a context base class will be apparent.

The subscriber record context object 820 may extend the context base class 810 by adding one or more attributes or actions. For example, subscriber record context object 820 may include protected variables, such as "subscriberRecord" and "recordFetched" for storing a subscriber record and an indication as to whether such subscriber record has been fetched, respectively.

As will be understood, a subscriber record may be stored at an external device with respect to the DRA. Subscriber records may store various data related to a subscriber. For example, a subscriber record may store one or more subscriber ids, guaranteed bitrates, maximum bitrates, aggregate maximum bitrates, or charging metrics.

Computational context objects such as subscriber record context object 820 may include one or more other objects also defined by a context artifact. For example, subscriber record context object 820 may include a Subscriber-IDs object that includes attributes or actions useful for accessing one or more fields of a subscriber record that store subscriber identifiers. Subscriber-IDs object 830 may include a "get" attribute that may return a list of subscriber identifiers from the subscriber record. In various embodiments, a rule may simply reference the object name to access a "get" attribute, without specifying the "get" attribute itself. For example, a rule may reference "Subscriber Record.Subscriber-IDs" to retrieve the list of subscriber identifiers, instead of "Subscriber Record.Subscriber-IDs.get." The Subscriber-IDs object 830 may also include "add," "remove," and "set" actions for adding, removing, and modifying a subscriber identifier of the subscriber record. Some actions may accept one or more parameters. For example, a rule might call "Subscriber Record.Subscriber-IDs.add foo" to add a new subscriber identifier "foo" to the subscriber record. It will be understood that subscriber record context object 820 may include numerous additional objects similar to Subscriber-IDs object 830. For example, the subscriber record context object 820 may include a guaranteed bitrate object or a quality of service (QoS) object (not shown).

Various attributes and actions described with respect to subscriber record context object 820 may rely on the presence of a subscriber record. As such, the subscriber record context object 820 may also include a protected "FetchRecord" function that may extract one or more subscriber identifiers from a received message and attempt to request a subscriber record from an SPR that matches the subscriber identifiers. In various embodiments, the "FetchRecord" function may be called when a subscriber record context object is initialized, such as by a class constructor of the routing decision context object. In other embodiments, the subscriber record context object 820 may not call "FetchRecord" until such time as the subscriber record is to be used. For example, the "get," "add," "remove," and "set" components may each call "FetchRecord" when the "recordFetched" variable is false.

Various actions or functions of the routing record context object 620 or subscriber record context object 820 may modify a record to be stored for later use. For example, a subscriber record context object 820 may add a subscriber identifier to a subscriber record. In various embodiments, the routing record context object 620 or subscriber record context object 820 may modify a variable storing the record local to the respective context object and commit the record back to storage at a later time. For example, a destructor function of the routing record context object 620 or subscriber record context object 820 may transmit the respective record to an appropriate storage device for later use.

Figure 9:
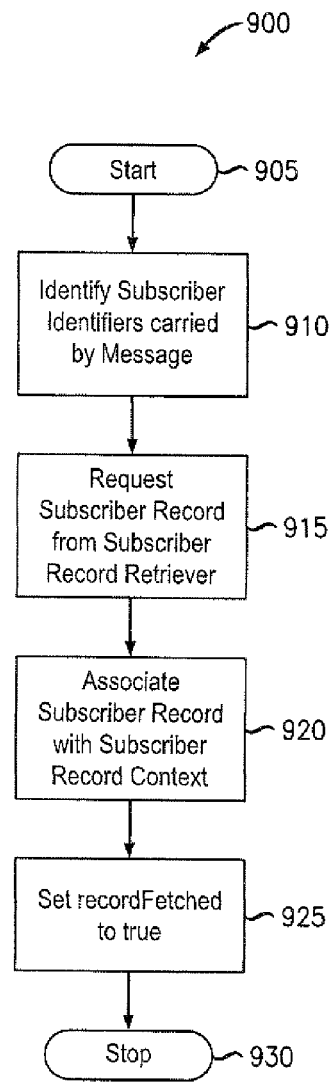
FIG. 9 illustrates an exemplary method for retrieving a subscriber record.

FIG. 9 illustrates an exemplary method 900 for retrieving a subscriber record. Method 900 may correspond to the "FetchRecord" function of subscriber record context object 820. Method 900 may be performed by the components of a DRA such as, for example, context creator 230.

Method 900 may begin in step 905 and proceed to step 910 where the DRA may identify one or more subscriber identifiers carried by the received Diameter message. For example, the DRA may extract an IPv4 address, and IPv6 address, and an APN from the Diameter message. Alternatively, the subscriber record context object may already store subscriber identifiers extracted from the Diameter message upon instantiation. Next, in step 915, the DRA may request a subscriber record from another device, such as an SPR. In doing so, a function of a subscriber record context object may invoke other functionality of the DRA such as a subscriber record retriever module 260 that is also used by other components of the DRA. After receiving a subscriber record in response to the request sent in step 915, the DRA may, in step 920, associate the subscriber record with the subscriber record context object. For example, the DRA may store the subscriber record among one or more variables of the subscriber record context object. Then, in step 925, the DRA may set the recordFetched variable of the subscriber record context object to a value of "true" to prevent the subscriber record context object from attempting to re-fetch the subscriber record. Method 900 may then proceed to end in step 930.

As with other context objects, a user may define various rules having references to the attributes and actions of routing decision context objects and subscriber record context objects. For example, a user may specify a rule set by providing the following pseudocode rule definitions:

```
RULE SETS:
    Gx CCR
IF (RULE CheckDecision)
    Routing Decision.Decision-Exists
THEN
    Routing Decision.Update-Message-With-Destination
    Routing Decision.Update-Timestamp
ELSE
    IF (RULE FlooberRule)
        Subscriber Record.Subscriber-IDs Contains Substring floober
    THEN
        Gx CCR.Destination-Host.add foo.bar.com
        Gx CCR.Destination-Realm.set bar.com
        Routing Decision.Create-New-Routing-Decision
    ELSE
        Subscriber.Subscriber-IDs.add floober
```

Upon receiving the above pseudocode, a DRA may generate a rule set in a form that may be more quickly or efficiently evaluated during runtime. Various alternative methods for enabling a user to define rules or a rule set will be apparent.

Figure 10:
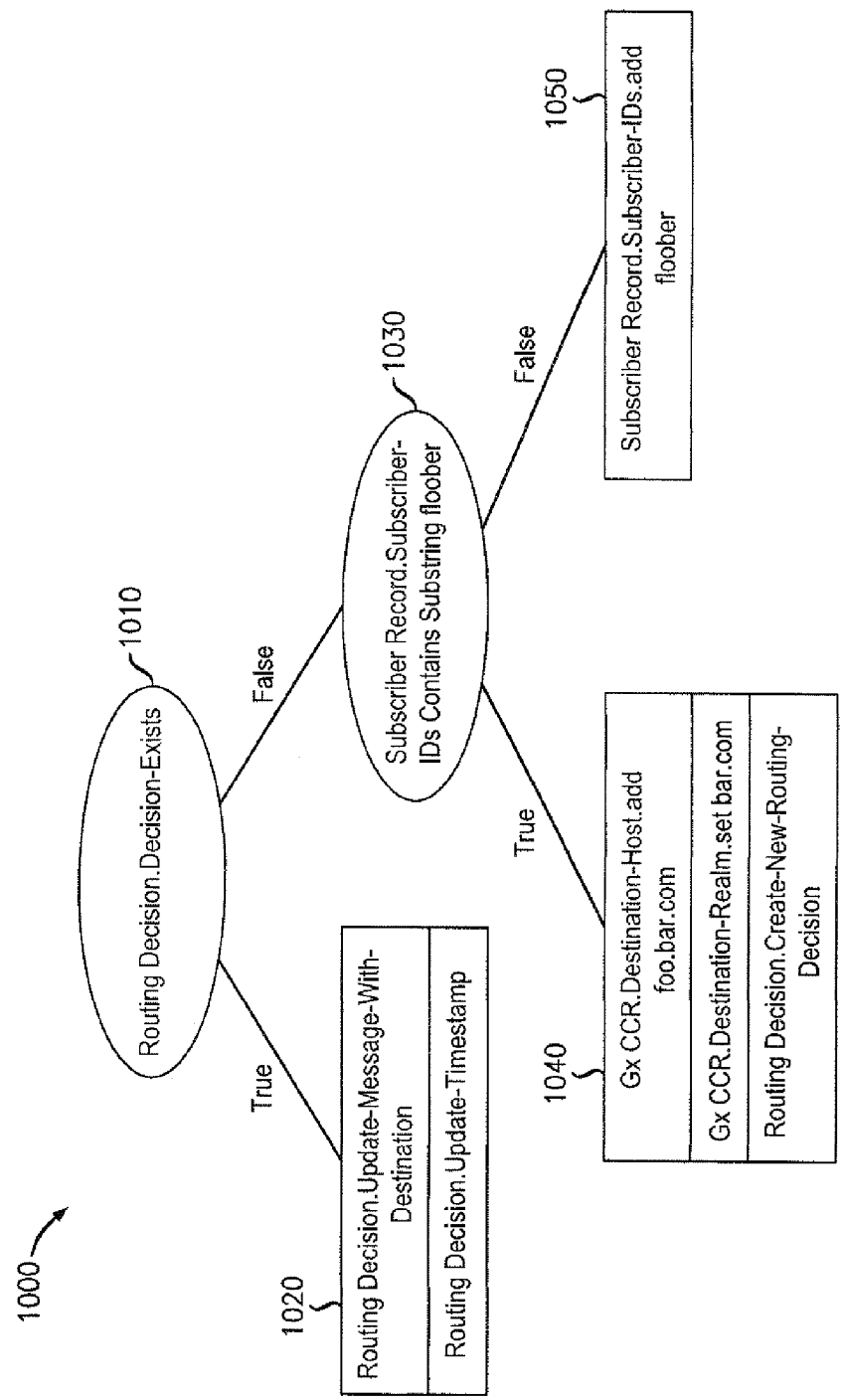
FIG. 10 illustrates an exemplary rule set.

FIG. 10 illustrates an exemplary rule set 1000. Rule set 1000 may be stored in a rule storage such as rule storage 220 of DRA 200. In various embodiments, rule set 1000 may be stored as a binary decision tree, as illustrated. It will be apparent that various alternative arrangements may be used for storing a rule set. For example, rule set 1000 may be stored as a plurality of records that each include a criteria field for evaluation to determine whether a rule is applicable and a result field storing an action to be taken when the rule is applicable. Further, rule set 1000 may be stored as, for example, a table in a database stored in rule storage 220. Alternatively, rule set 1000 could be a series of linked lists, an array, or a similar data structure. Thus, it should be apparent that rule set 1000 may be an abstraction of the underlying data; any data structure suitable for storage of this data may be used.

Rule set 1000 may be applicable to Gx CCR Diameter messages. Rule set 1000 may have been generated based on user-provided pseudo-code such as the above example. A DRA may store separate message type-specific rule sets (not shown) for a number of different message types. Rule set 1000 may include criteria nodes such as criteria nodes 1010, 1030 and result nodes such as result nodes 1020, 1040, 1050. It will be apparent that rule set 1000 is exemplary and that various embodiments may include rule sets (not shown) that are more complex than the rule set 1000 as illustrated.

Criteria nodes may present a condition to be evaluated by a rule engine. Based on the evaluation, the rule engine may select another criteria node or a result node to evaluate. As an example, criteria node 1010 may store the condition "Routing Decision.Decision-Exists." Upon evaluation of criteria node 1010, a rule engine may determine whether the condition is true or false. For example, the rule engine may read a "Decision-Exists" attribute from a "Routing Decision" context object. In doing so, the Routing Decision context object may retrieve a routing decision record based on the received Diameter message. If the Decision-Exists attribute is true, the rule engine may move on to evaluate result node 1020. If the Decision-Exists attribute is false, the rule engine may move on the evaluate criteria node 1030.

Result nodes may present one or more actions to be performed by a rule engine. Such actions may include, for example, modifying a Diameter message or transmitting a Diameter message to a particular device. As an example, result node 1020 may indicate that the rule engine should access two actions of the Routing Decision context object: the "Update-Message-With-Destination" and "Update-Timestamp" actions. The rule engine may then be finished evaluating rule set 1000.

Criteria node 1030 may include a condition that invokes a subscriber record context object by including the condition "Subscriber Record.Subscriber-IDs Contains Substring floober." In evaluating criteria node 1030, the rule engine may access a "Subscriber-IDs" attribute of the "Subscriber Record" context object and then determine whether the returned data includes the substring "floober." If the substring is present, the rule engine may move on to evaluate result node 1040. Otherwise, the rule engine may move on to evaluate result node 1050.

Result node 1040 may include references to different types of context objects. For example, result node 1040 may specify that a rule engine should access an add action and a set action of a Gx CCR context object to update the Destination-Host and Destination-Realm AVPs of the received Diameter message. Result node 1040 may also specify that a rule engine should access a "Create-New-Routing-Decision" action of a "Routing Decision" context object to preserve the Destination-Host and Destination-Realm values for future use with regard to other Diameter messages. Result node 1050 may specify that a rule engine should add a new subscriber identifier "floober" to the subscriber record by accessing an "add" action of the "Subscriber Record" context object.

According to the foregoing, various embodiments enable robust and dynamic handling of various Diameter messages at a diameter routing agent. In particular, by generating computational context objects based on context artifacts, a DRA may facilitate a user in specifying complex behaviors to be followed in processing various Diameter messages. For example, a user may base behaviors on previous routing decisions or the content of a subscriber record. Further, a user may extend functionality by adding new context artifacts that may specify additional types of context objects. Various additional benefits will be apparent from the foregoing disclosure.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a Diameter Routing Agent (DRA) for processing a Diameter message, the method comprising:
   receiving a Diameter message at the DRA from an origin device;
   establishing a routing decision context object in response to receiving the Diameter message, wherein the routing decision context object is associated with a destination device chosen to receive a previous message;
   evaluating a rule that includes a context object reference, wherein the evaluation includes accessing the routing decision context object based on the context object reference; and
   transmitting a message based on the evaluation of the rule.

2. The method of claim 1, wherein transmitting a message based on the evaluation of the rule comprises transmitting the Diameter message to the destination device.

3. The method of claim 1, wherein the Diameter message is associated with a first Diameter application and the previous message is associated with a second Diameter application.

4. The method of claim 1, further comprising, prior to receiving the Diameter message:
   receiving the previous message at the DRA;
   deciding that the previous message should be routed to the destination device;
   transmitting the previous message to the destination device; and
   storing an identification of the previous message and the destination device as a routing decision.

5. The method of claim 4, wherein accessing the routing decision context object comprises updating a timestamp associated with the routing decision.

6. The method of claim 4, further comprising:
   determining that the routing decision should be deleted based on a timestamp associated with the routing decision; and
   deleting the routing decision from a memory of the DRA.

7. The method of claim 1, wherein at least one of establishing the routing decision context object and accessing the routing decision context object comprises:
   extracting at least one piece of identifying information from the Diameter message; and
   determining that the at least one piece of identifying information corresponds to the previous message.

8. A Diameter Routing Agent (DRA) for processing a Diameter message, the DRA comprising:
   a rule storage configured to store a rule that includes a context object reference;
   a routing decision database configured to store a previous routing decision, wherein the previous routing decision includes an identification of a destination device chosen for a previous message;
   a Diameter stack configured to receive a Diameter message from an origin device;
   a context creator configured to establish a routing decision context object based on receiving the Diameter message, wherein the routing decision context object is associated with the previous routing decision;
   a rule engine configured to evaluate the rule, wherein the evaluation includes accessing the routing decision context object based on the context object reference; and
   a message handler configured to transmit, via the Diameter stack, a message based on the evaluation of the rule.

9. The DRA of claim 8, wherein, in transmitting the message based on the evaluation of the rule, the message handler is configured to transmit the Diameter message to the destination device.

10. The DRA of claim 8, wherein the Diameter message is associated with a first Diameter application and the previous message is associated with a second Diameter application.

11. The DRA of claim 8, wherein:
    the Diameter stack is further configured to receive the previous message prior to receiving the Diameter message;
    the rule engine is further configured to decide that the previous message should be routed to the destination device; and
    the routing decision context object is configured to, based on an access by the rule engine, store an identification of the previous message and the destination device as a routing decision.

12. The DRA of claim 11, wherein the routing decision context object is configured to, based on an access by the rule engine, update a timestamp associated with the routing decision.

13. The DRA of claim 11, further comprising a cleanup module configured to:
    determine that the routing decision should be deleted based on a timestamp associated with the routing decision; and
    delete the routing decision from a memory of the DRA.

14. The DRA of claim 8, wherein, the routing decision context object is configured to:

extract at least one piece of identifying information from the Diameter message; and determine that the at least one piece of identifying information corresponds to the previous message.

15. A non-transitory machine-readable storage medium encoded with instructions for execution by a Diameter Routing Agent (DRA) for processing a Diameter message, the medium comprising:

instructions for receiving a Diameter message at the DRA from an origin device;

instructions for establishing a routing decision context object in response to receiving the Diameter message, wherein the routing decision context object is associated with a destination device chosen to receive a previous message;

instructions for evaluating a rule that includes a context object reference, including instructions for accessing the routing decision context object based on the context object reference; and instructions for transmitting a message based on the evaluation of the rule.

16. The non-transitory machine-readable storage medium of claim 15, wherein the Diameter message is associated with a first Diameter application and the previous message is associated with a second Diameter application.

17. The non-transitory machine-readable storage medium of claim 15, further comprising:

instructions for receiving the previous message at the DRA;

instructions for deciding that the previous message should be routed to the destination device;

instructions for transmitting the previous message to the destination device; and instructions for storing an identification of the previous message and the destination device as a routing decision.

18. The non-transitory machine-readable storage medium of claim 17, wherein the instructions for accessing the routing decision context object comprise instructions for updating a timestamp associated with the routing decision.

19. The non-transitory machine-readable storage medium of claim 17, further comprising:

instructions for determining that the routing decision should be deleted based on a timestamp associated with the routing decision; and instructions for deleting the routing decision from a memory of the DRA.

20. The non-transitory machine-readable storage medium of claim 15, wherein at least one of the instructions for establishing the routing decision context object and the instructions for accessing the routing decision context object comprise:

instructions for extracting at least one piece of identifying information from the Diameter message; and instructions for determining that the at least one piece of identifying information corresponds to the previous message.

* * * * *